US011887522B2

(12) United States Patent
Kim

(10) Patent No.: US 11,887,522 B2
(45) Date of Patent: Jan. 30, 2024

(54) TIMING CONTROLLER, DRIVER, AND DISPLAY SYSTEM INCLUDING THEM

(71) Applicant: LX Semicon Co., Ltd., Daejeon (KR)

(72) Inventor: Seok Hoo Kim, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 17/984,992

(22) Filed: Nov. 10, 2022

(65) Prior Publication Data

US 2023/0177992 A1 Jun. 8, 2023

(30) Foreign Application Priority Data

Dec. 7, 2021 (KR) ........................ 10-2021-0174091

(51) Int. Cl.
*G09G 3/20* (2006.01)

(52) U.S. Cl.
CPC ....... *G09G 3/20* (2013.01); *G09G 2310/0291* (2013.01); *G09G 2310/08* (2013.01); *G09G 2330/021* (2013.01)

(58) Field of Classification Search
CPC ............. G09G 3/20; G09G 2310/0291; G09G 2310/08; G09G 2330/021
See application file for complete search history.

(56) References Cited

U.S. PATENT DOCUMENTS 6,473,061 B1 * 10/2002 Lim ..................... G09G 3/2807 345/55
6,587,602 B2 * 7/2003 Wakisawa ............. G06T 3/4007 345/670
2003/0234754 A1 * 12/2003 Abe ..................... G09G 3/3241 345/76
2004/0008174 A1 * 1/2004 Beaudoin ............... G09G 5/363 345/100
2008/0298707 A1 * 12/2008 Kubo ................... G09G 3/2011 382/260
2009/0041380 A1 * 2/2009 Watanabe ............ G09G 3/2092 382/276
2019/0147782 A1 * 5/2019 Pyun .................... G09G 3/3677 345/214
2019/0147789 A1 * 5/2019 Morita ..................... G09G 3/20 345/690
2019/0147790 A1 * 5/2019 Chung ................... G09G 3/006 345/213
2019/0147800 A1 * 5/2019 Bae ....................... G06F 3/0416 345/173
2019/0147828 A1 * 5/2019 Onoue ..................... G09G 3/20 345/520
2019/0147831 A1 * 5/2019 Lee .......................... G09G 3/20 345/691

FOREIGN PATENT DOCUMENTS

KR 2007-0000163 A 6/2005
KR 2007-0116408 A 12/2007
KR 2021-0017463 A 2/2021

* cited by examiner

*Primary Examiner* — Sejoon Ahn
(74) *Attorney, Agent, or Firm* — POLSINELLI PC

(57) ABSTRACT

Disclosed are a timing controller and driver which are improved to have a function of compensating a source signal to be provided to a display panel, and a display system including the timing controller and the driver.

15 Claims, 5 Drawing Sheets

TIMING CONTROLLER, DRIVER, AND DISPLAY SYSTEM INCLUDING THEM

BACKGROUND

1. Technical Field

Various embodiments generally relate to a display system, and more particularly, to a timing controller and driver which are improved to have a function of compensating a source signal to be provided to a display panel, and a display system including the timing controller and the driver.

2. Related Art

A display system may include a timing controller and a driver to display an image on a display panel.

It may be understood that an image displayed on the display panel includes frames which are changed according to a driving frequency, and each frame may include a plurality of horizontal lines which are arranged in a vertical direction. It may be understood that the driving frequency corresponds to a vertical period, and the number of horizontal lines included in one frame varies depending on a resolution. It may be understood that one horizontal line corresponds to one horizontal period and includes a plurality of pixels.

The horizontal lines have different locations in the vertical direction on the display panel. Therefore, the load of the display panel acting on receiving a source signal corresponding to display data from the driver may vary. The load may vary for each display panel.

Therefore, in order for each of the pixels of each horizontal line to display an accurate brightness corresponding to display data, a source signal needs to be compensated in consideration of the location of the horizontal line separated from the driver.

The driver may be configured to control components which consume power, in order to realize low-power driving. For example, in order for low-power driving, power to be provided to a gamma circuit may be controlled.

However, in order to realize more efficient low-power driving, it is necessary to control power in consideration of a change in brightness between adjacent horizontal lines or between the pixels of adjacent horizontal lines on the display panel.

SUMMARY

Various embodiments are directed to a timing controller and driver capable of driving a pixel with a desired brightness by compensating a load of a display panel likely to differently act depending on the location of a horizontal line with respect to the driver, and a display system including them.

Also, various embodiments are directed to a timing controller and driver capable of realizing low-power driving by controlling the power of an output buffer in consideration of a change in brightness between adjacent horizontal lines or pixels of adjacent horizontal lines, and a display system including them.

In an embodiment, a timing controller of a display system may include: a location weight provider configured to provide a location weight corresponding to a horizontal line on which display data of a current horizontal period is displayed; and a data converter configured to output a transmission signal in which the display data corresponding to the current horizontal period and control data are configured as a packet, the control data including a compensation weight corresponding to the location weight.

In an embodiment, a driver of a display system may include: a recoverer configured to receive a transmission signal, and recover and output display data of a current horizontal period and control data included in the transmission signal; a signal processing unit configured to generate an analog signal corresponding to the display data; a controller configured to provide a driving control signal in response to a compensation weight included in the control data; and an output buffer configured to output a source signal corresponding to the analog signal, and be controlled by the driving control signal in power for outputting the source signal, wherein the compensation weight corresponds to a location weight corresponding to a horizontal line of a display panel on which the display data of the current horizontal period is displayed.

In an embodiment, a display system may include: a timing controller configured to provide a transmission signal; and a driver configured to receive the transmission signal, recover display data of a current horizontal period and control data included in the transmission signal, and output a source signal corresponding to the display data and the control data, the timing controller including: a location weight provider configured to provide a location weight corresponding to a horizontal line on which the display data of the current horizontal period is displayed; a gray weight provider configured to provide a gray weight corresponding to a gray difference between display data of a previous horizontal period and the display data of the current horizontal period; a compensation weight provider configured to provide a compensation weight obtained by calculating the location weight and the gray weight; and a data converter configured to output the transmission signal including the display data and the control data, the control data including the compensation weight, wherein the driver generates an analog signal corresponding to the display data and a driving control signal corresponding to the compensation weight, outputs a source signal corresponding to the analog signal through an output buffer, and controls power of the output buffer for outputting the source signal by the driving control signal.

According to the embodiments of the present disclosure, it is possible to compensate a load acting on a horizontal line by using a location weight corresponding to the horizontal line. That is to say, according to the embodiments of the present disclosure, since the power of an output buffer is controlled according to a location of the horizontal line through which a source signal is outputted, it is possible to compensate the load.

As a result, according to the embodiments of the present disclosure, it is possible to compensate for a difference in brightness that may be caused due to differences in distance between a driver which outputs a source signal corresponding to display data and respective horizontal lines or pixels, and thus, advantages are provided in that the horizontal lines of a display panel may display desired brightnesses regardless of the locations thereof.

In addition, according to the embodiments of the present disclosure, it is possible to control the power of an output buffer in consideration of a change in brightness between adjacent horizontal lines due to display data. Therefore, there is an advantage that the driver may be driven with low power.

DETAILED DESCRIPTION

Figure 1:
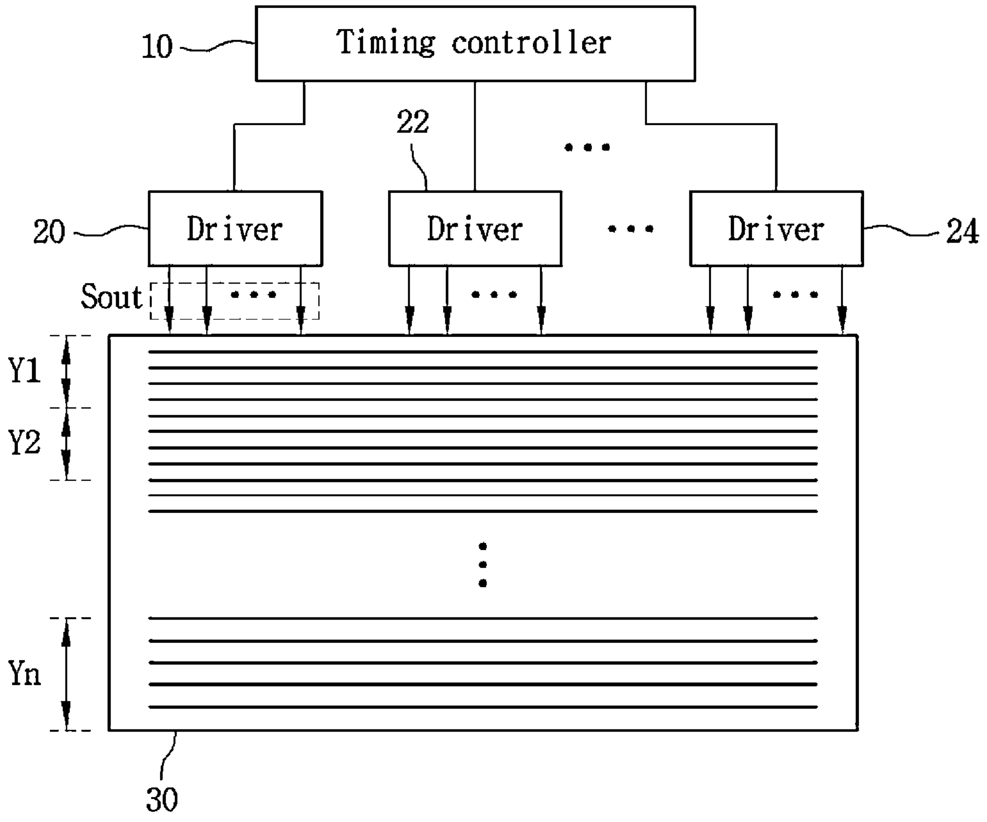
FIG. 1 is a block diagram illustrating a display system in accordance with an embodiment of the present disclosure.

As shown in FIG. 1, a display system in accordance with an embodiment of the present disclosure may be exemplified as including a timing controller 10, drivers 20, 22 and 24 and a display panel 30.

The timing controller 10 receives display data for displaying an image, from a data source (not shown). The timing controller 10 may be configured to provide a transmission signal configured as a packet to include, for example, display data, control data and a clock, to the drivers 20, 22 and 24.

The drivers 20, 22 and 24 may be configured to display an image on the display panel 30 by providing a source signal Sout corresponding to the display data to the display panel 30.

The number of drivers 20, 22 and 24 may be determined depending on the size and resolution of the display panel 30.

The drivers 20, 22 and 24 are configured to output source signals Sout to respective divided horizontal regions of the display panel 30, and the timing controller 10 is configured to provide display data corresponding to the horizontal regions to the drivers 20, 22 and 24, respectively.

The display panel 30 may be configured to include pixels which are arranged in the form of a matrix having a plurality of columns and a plurality of rows to display an image.

The display panel 30 receives the source signals Sout through column lines (not shown) corresponding to the plurality of columns, and receives a row signal which is inputted sequentially to row lines (not shown) corresponding to the plurality of rows. Accordingly, the row lines may be sequentially driven from one closest to the drivers 20, 22 and 24 in response to the row signal inputted sequentially to the display panel 30. The column lines may be understood as being formed in a vertical direction, and the row lines may be understood as being formed in a horizontal direction.

It may be understood that one frame of an image displayed on the display panel 30 includes a plurality of horizontal lines. The horizontal line may be understood as corresponding to the row line. A frame may be identified by a vertical synchronization signal, and a horizontal line in the frame may be identified by a horizontal synchronization signal. It may be seen that the horizontal synchronization signal is used to identify a horizontal period.

In other words, the display panel 30 may display a horizontal line for each horizontal period identified by the horizontal synchronization signal, and may display an image of one frame identified by the vertical synchronization signal. Therefore, in the embodiment of the present disclosure, it may be understood that the horizontal line includes pixels which are driven by one row signal during the horizontal period.

The horizontal lines of the display panel 30 may be sequentially driven from one closest to the drivers 20, 22 and 24 to one farthest from the drivers 20, 22 and 24.

First, the present disclosure may be implemented to compensate for that the load of the display panel 30 acting on the source signals Sout differs depending on the location of a horizontal line separated in the vertical direction from the drivers 20, 22 and 24.

The source signals Sout are transferred through the column lines in a direction crossing with the row lines, and the load of the display panel 30 acting on the source signals Sout may differ depending on the location of a horizontal line.

Figure 2:
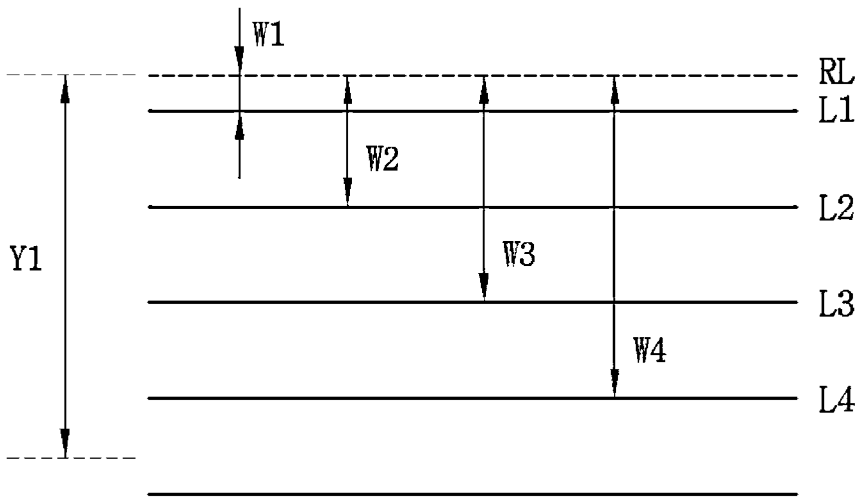
FIG. 2 is a diagram for explaining location weights.

In more detail, referring to FIGS. 1 and 2, the display panel 30 may be divided into a plurality of display regions Y1 to Yn in the vertical direction. The plurality of display regions Y1 to Yn may be divided by the unit of a predetermined number of horizontal lines. For example, each of the display regions Y1 to Yn may include the same number of horizontal lines.

In FIG. 1, the display region Y1 is a display region located closest to the drivers 20, 22 and 24, and the display region Yn is a display region located farthest from the drivers 20, 22 and 24.

FIG. 2 illustrates horizontal lines L1 to L4 of the display region Y1 of the display panel 30. In FIG. 2, RL indicates a reference location at which the source signals Sout of the drivers 20, 22 and 24 are applied, and the horizontal lines L1 to L4 are configured to have different distances W1 to W4 from the reference location RL.

Referring to FIGS. 1 and 2, a load to act on the source signals Sout of the drivers 20, 22 and 24 may increase according to distances at which the horizontal lines of the display panel 30 are located. Also, a load to act on the source signals Sout of the drivers 20, 22 and 24 may increase according to distances at which the plurality of display regions Y1 to Yn are located.

The source signal Sout may be provided at a lower level to a horizontal line as the load of the display panel 30 increases. Namely, a load to act on the source signals Sout may increase as a horizontal line or a display region is farther away from the drivers 20, 22 and 24, and the source signals Sout may be provided at a lower level in a corresponding manner.

In order to compensate for this, the present disclosure may set a location weight of a higher value so as to compensate the source signals Sout which decrease as a horizontal line or a display region is farther away from an input location of the source signals Sout of the display panel 30, that is, a location where the source signals Sout are applied.

That is to say, in the embodiment of the present disclosure, in order to compensate a load of the display panel 30 which may act differently depending on the location of a horizontal line, a location weight for each horizontal line may be set in the timing controller 10.

If a weight is applied to each of all horizontal lines, a storage capacity may increase. In order to prevent this, the same location weight may be applied to horizontal lines included in the same display region.

In other words, location weights may be set differently for the plurality of respective display regions Y1 to Yn. In this case, the same location weight may be provided to horizontal lines included in the same display region. For example, for the horizontal lines L1 to L4 included in the display region Y1, a location weight may be provided as the same value which is set to represent the display region Y1.

Accordingly, in the embodiment of the present disclosure, the timing controller 10 may be configured to provide control data including a location weight corresponding to each horizontal line or each display region on which display data of a current horizontal period is displayed.

In addition, the present disclosure may be implemented to control power for driving the source signal Sout according to a difference between the source signals Sout of adjacent horizontal lines.

When a difference between the source signals Sout of adjacent horizontal lines is small, the embodiment of the present disclosure may be configured to drive the source signal Sout with low power. Conversely, when a difference between the source signals Sout of adjacent horizontal lines is large, the embodiment of the present disclosure may be configured to drive the source signal Sout with high power. In the embodiment of the present disclosure, by compensating, as described above, power for driving the source signal Sout, it is possible to appropriately control low-power driving according to a change in the source signal Sout.

Figure 3:
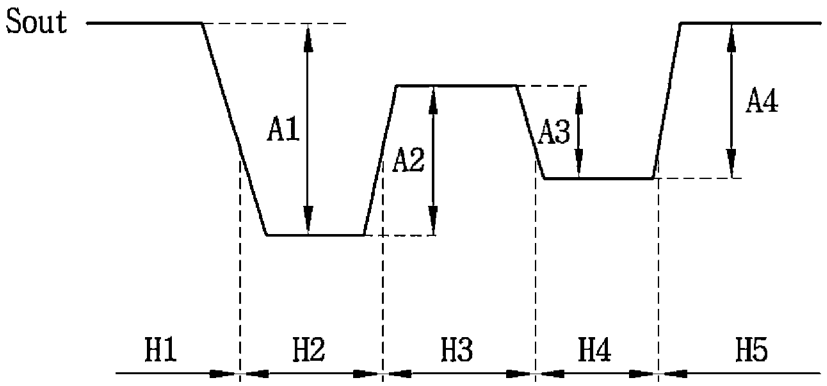
FIG. 3 is a waveform diagram for explaining changes in brightness between adjacent horizontal lines.

In more detail, the source signal Sout provided to each of the horizontal lines may be changed in each horizontal period. For example, the source signal Sout may be changed in each of horizontal periods H1 to H5 as shown in FIG. 3. It may be understood that the horizontal periods H1 to H5 are successive horizontal periods. The level of the source signal Sout for each of the horizontal periods H1 to H5 is exemplified as representing a corresponding horizontal line for the sake of convenience in explanation, and the source signal Sout of a different level may be provided for each of the pixels of the same horizontal period.

In the case of FIG. 3, the source signals Sout of adjacent horizontal lines may have a difference of A1 as in a horizontal period H1 and a horizontal period H2, may have a difference of A2 as in the horizontal period H2 and a horizontal period H3, may have a difference of A3 as in the horizontal period H3 and a horizontal period H4, and may have a difference of A4 as in the horizontal period H4 and a horizontal period H5.

Figure 4:
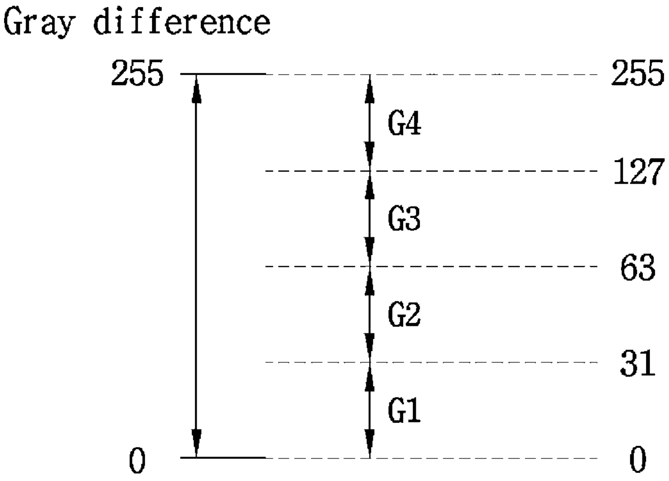
FIG. 4 is a diagram for explaining gray weights depending on a gray difference.

When a gray range for expressing a pixel includes 256 grays between 0 gray and 255 gray, a gray difference between the source signals Sout of adjacent horizontal lines may be formed in a range of 0 gray to 255 grays as shown in FIG. 4. It may be understood that the gray difference between the source signals Sout of adjacent horizontal lines corresponds to a gray difference between display data of a previous horizontal period and display data of a current horizontal period.

In the embodiment of the present disclosure, the timing controller 10 may be configured to provide control data by using a gray weight corresponding to a gray difference range.

Gray difference ranges may be expressed as shown in FIG. 4, and in FIG. 4, the maximum value of a gray difference is exemplified as 255 grays. In FIG. 4, the maximum range of a gray difference may be divided into a plurality of gray difference ranges G1, G2, G3 and G4, and a gray weight may be differently set for each of the plurality of divided gray difference ranges G1, G2, G3 and G4.

For example, the gray difference range G1 corresponds to a case where a gray difference between the source signals Sout of adjacent horizontal lines is equal to or less than 31 grays, the gray difference range G2 corresponds to a case where a gray difference between the source signals Sout of adjacent horizontal lines exceeds 31 grays and is equal to or less than 63 grays, the gray difference range G3 corresponds to a case where a gray difference between the source signals Sout of adjacent horizontal lines exceeds 63 grays and is equal to or less than 127 grays, and the gray difference range G4 corresponds to a case where a gray difference between the source signals Sout of adjacent horizontal lines exceeds 127 grays and is equal to or less than 255 grays.

Gray weights of different values corresponding to respective gray difference ranges are set in the timing controller 10. The timing controller 10 is configured to determine a gray difference range to which a gray difference between the source signals Sout of adjacent horizontal lines corresponds, and to provide control data by using a gray weight set to the corresponding gray difference range.

Figure 5:
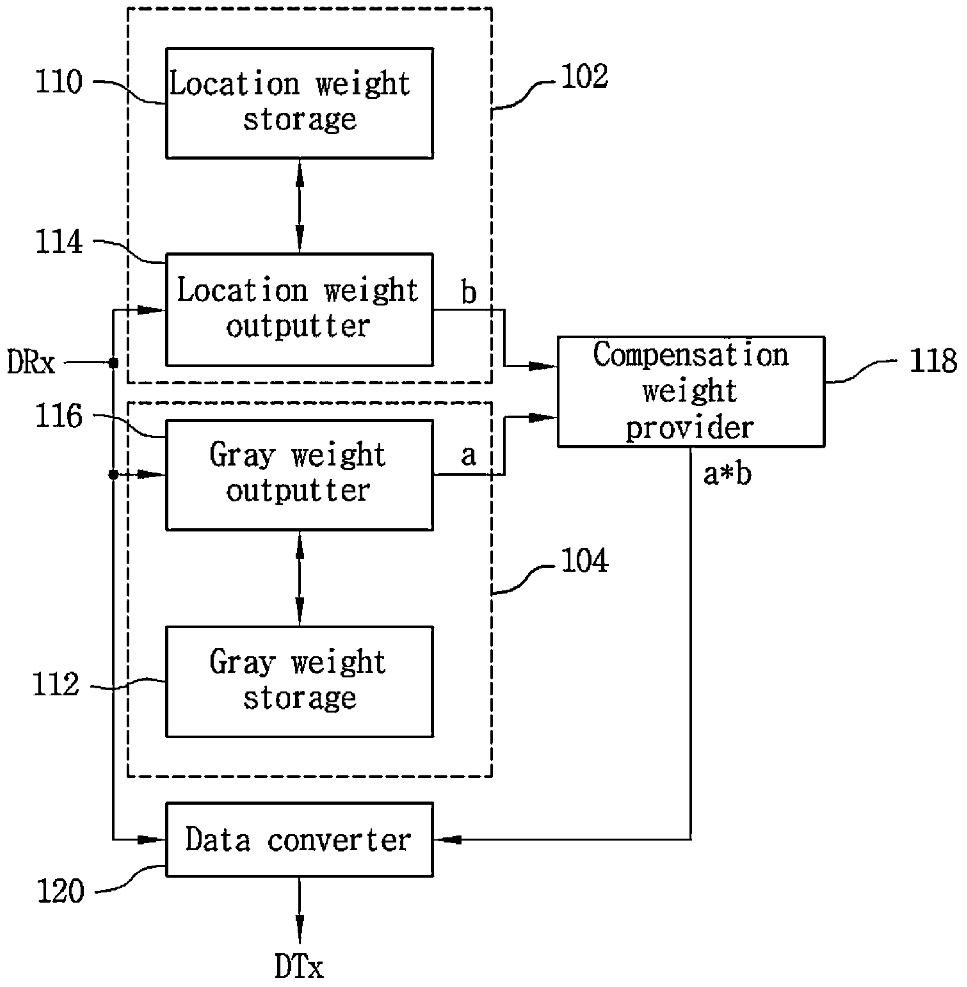
FIG. 5 is a block diagram illustrating a timing controller of a display system in accordance with an embodiment of the present disclosure.

The timing controller 10 may be implemented as shown in FIG. 5 to provide control data using the above-described location weight or to provide control data using the above-described location weight and gray weight.

Referring to FIG. 5, the timing controller 10 may be implemented to include a location weight provider 102, a gray weight provider 104, a compensation weight provider 118 and a data converter 120. In FIG. 5, display data of a current horizontal period received by the timing controller 10 is denoted by DRx, and a transmission signal outputted from the timing controller 10 is denoted by DTx.

The location weight provider 102 is configured to receive the display data DRx of the current horizontal period and provide a location weight b corresponding to a horizontal line on which the display data DRx of the current horizontal period is displayed.

The gray weight provider 104 is configured to receive the display data DRx of the current horizontal period and provide a gray weight a corresponding to a gray difference between display data of a previous horizontal period and the display data DRx of the current horizontal period.

The compensation weight provider 118 is configured to provide a compensation weight a*b using the location weight b when only the location weight b is provided, and is configured to provide a compensation weight a*b by calculating the location weight b and the gray weight a when the location weight b and the gray weight a are provided.

The data converter 120 is configured to receive the display data DRx of the current horizontal period and output the transmission signal DTx including the display data DRx of the current horizontal period and control data. The control data may include a compensation weight. The control data may be configured to further include additional information for low-power driving of the drivers 20, 22 and 24, and the additional information may be understood as meaning option data of preset values for the low-power driving.

First, the operation of the embodiment when the compensation weight a*b is provided using the location weight b will be described below.

In this case, the location weight provider 102 may store a plurality of preset location weights corresponding to a plurality of display regions, respectively, into which the display panel 30 is divided in order to save a memory capacity, and may be configured to provide the location weight b of a display region including a horizontal line on which the display data DRx of the current horizontal period is displayed, among the plurality of stored location weights.

In order for the above operation, the location weight provider 102 may include a location weight storage 110 and a location weight outputter 114.

The location weight storage 110 may store the plurality of preset location weights b corresponding to the plurality of display regions, respectively, into which the display panel 30 is divided. The location weight outputter 114 may be configured to receive the display data DRx of the current horizontal period, provide location information of a horizontal line corresponding to the display data DRx of the current horizontal period on the display panel 30, to the location weight storage 110, and receive and output the location weight b of a display region corresponding to the location information. Namely, when receiving the display data DRx of the horizontal line L2 included in the display region Y1, the location weight outputter 114 may provide location information of the horizontal line L2 on the display panel 30, to the location weight storage 110, and may receive and output the location weight b of the display region Y1 corresponding to the location information of the horizontal line L2.

When the location weight b is provided from the location weight provider 102, the compensation weight provider 118 may provide the compensation weight a*b including the location weight b.

The data converter 120 is configured to output the transmission signal DTx in which the display data DRx corresponding to the current horizontal period and the control data are configured as a packet. The control data may be configured to include the compensation weight a*b of the compensation weight provider 118 corresponding to the location weight b.

Next, the operation of the embodiment when the compensation weight a*b is provided using the location weight b and the gray weight a will be described below.

Since the providing of the location weight b to the compensation weight provider 118 may be understood from the above description, repeated description thereof will be omitted.

The gray weight provider 104 may be configured to provide the gray weight a corresponding to a gray difference between display data of a previous horizontal period and the display data DRx of the current horizontal period.

The gray weight provider 104 may store the plurality of preset gray weights corresponding to the plurality of gray difference ranges, respectively, described above with reference to FIG. 4, and may be configured to provide the gray weight a of a gray difference range in which the gray difference between the display data of the previous horizontal period and the display data DRx of the current horizontal period is included.

To this end, the gray weight provider 104 may include a gray weight storage 112 and a gray weight outputter 116.

The gray weight storage 112 is configured to store the plurality of preset gray weights corresponding to the plurality of gray difference ranges into which the maximum range of a gray difference is divided as shown in FIG. 4. The gray weight outputter 116 may be configured to receive the display data DRx of the current horizontal period, provide a gray difference between the display data of the previous horizontal period and the display data DRx of the current horizontal period, to the gray weight storage 112, and receive and output the gray weight a of a gray difference range in which the gray difference is included. For example, when a gray difference between the display data of the previous horizontal period and the display data DRx of the current horizontal period is 53 grays, the gray weight storage 112 may provide the gray weight a corresponding to the gray difference range G2, and the gray weight outputter 116 may provide the gray weight a provided from the gray weight storage 112, to the compensation weight provider 118.

The compensation weight provider 118 is configured to provide the compensation weight a*b obtained by calculating the location weight b of the location weight provider 102 and the gray weight a of the gray weight provider 104. For example, the compensation weight provider 118 may be configured to provide the compensation weight a*b obtained by multiplying the location weight b and the gray weight a.

The data converter 120 may be configured to configure the control data including the compensation weight a*b, and output the transmission signal DTx in which the display data DRx of the current horizontal period and the control data are configured as a packet.

As an embodiment, the gray weight outputter 116 may be configured to provide a gray difference for each column between the display data of the previous horizontal period and the display data DRx of the current horizontal period, to the gray weight storage 112, and receive and output the gray weight a corresponding to the gray difference for each column.

Accordingly, the compensation weight provider 118 may provide the compensation weight a*b obtained by calculating each of gray weights a different for respective columns with the location weight b, and the data converter 120 may output the transmission signal DTx including the control data including the compensation weight a*b of a different value for each column of the current horizontal period.

Figure 6:
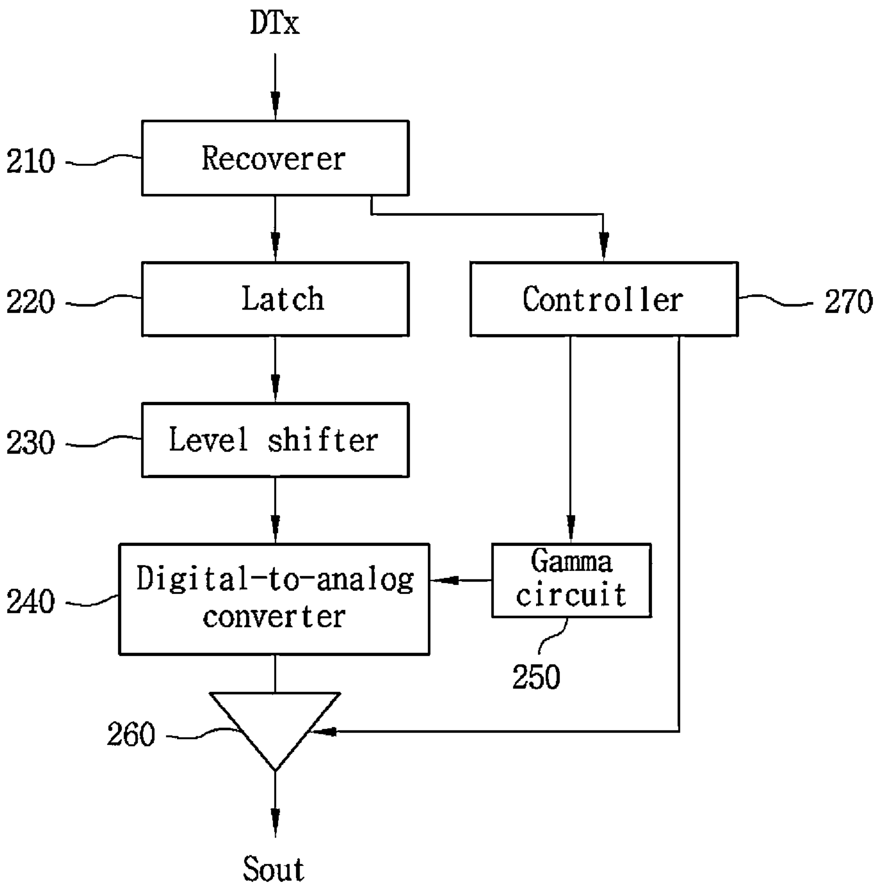
FIG. 6 is a block diagram illustrating a driver of a display system in accordance with an embodiment of the present disclosure.

In an embodiment of the display system in accordance with the present disclosure, each of the drivers 20, 22 and 24 may be configured as shown in FIG. 6. The configurations and operations of the drivers 20, 22 and 24 may be understood by the following description referring to the driver 20.

The driver 20 is configured to receive the transmission signal DTx provided from the timing controller 10, recover the display data DRx of the current horizontal period and the control data included in the transmission signal DTx, and output the source signal Sout corresponding to the display data DRx and the control data.

To this end, the driver 20 may include a recoverer 210, a latch 220, a level shifter 230, a digital-to-analog converter 240, a gamma circuit 250, an output buffer 260 and a controller 270.

In the above configuration, the recoverer 210 is configured to receive the transmission signal DTx and recover and output the display data DRx of the current horizontal period and the control data included in the transmission signal DTx. The recoverer 210 may first generate a clock before recovering the display data DRx and the control data, and may be configured to recover the display data DRx and the control data using the clock.

Among the above components, the latch 220, the level shifter 230, the digital-to-analog converter 240 and the gamma circuit 250 correspond to a signal processing unit which generates an analog signal corresponding to the display data DRx.

In detail, the latch 220 is configured to dispose the serial display data DRx in parallel. The level shifter 230 is configured to shift the level of the display data DRx to be appropriate for the digital-to-analog converter 240. The digital-to-analog converter 240 selects a gamma voltage corresponding to the display data DRx among gamma voltages provided from the gamma circuit 250, and outputs the selected gamma voltage as an analog signal. The gamma circuit 250 is configured to provide a plurality of gamma voltages corresponding to a preset gray range, to the digital-to-analog converter 240.

The output buffer 260 is configured to output the source signal Sout corresponding to the analog signal. In addition, the output buffer 260 is configured to receive a driving control signal of the controller 270, and the power of the output buffer 260 for outputting the source signal Sout may be controlled by the driving control signal.

The controller 270 is configured to receive the control data from the recoverer 210 and provide the driving control signal corresponding to a compensation weight included in the control data, to the output buffer 260.

The controller 270 may receive the control data to include option data of preset values for low-power driving. In this case, the controller 270 may provide a control signal corresponding to the option data, to the gamma circuit 250, and the gamma circuit 250 may realize low-power driving by controlling power for driving gamma buffers (not shown) by the control signal.

By the above description, the embodiment of the present disclosure may control the power of the output buffer 260 in response to a compensation weight obtained by calculation of a location weight or calculation of a location weight and a gray weight.

For example, the output buffer 260 may output the source signals Sout with power adjusted in response to the value of the location weight b applied to the compensation weight a*b. That is to say, when outputting the source signals Sout to a horizontal line close to the driver 20, the output buffer 260 may output the source signals Sout using relatively low power in response to the driving control signal of the controller 270, and when outputting the source signals Sout to a horizontal line far from the driver 20, the output buffer 260 may output the source signals Sout using relatively high power in response to the driving control signal of the controller 270.

As a result, the embodiment of the present disclosure may display a horizontal line with a gray corresponding to display data of a current horizontal period regardless of the influence of the load of the display panel 30.

In other words, according to the embodiments of the present disclosure, it is possible to compensate for a difference in brightness that may be caused due to differences in distance between a driver which outputs a source signal and respective horizontal lines or pixels, and thus, advantages are provided in that the horizontal lines of a display panel may display desired brightnesses regardless of the locations thereof.

Also, the output buffer 260 may output the source signals Sout with power adjusted in response to the value of the gray weight a applied to the compensation weight a*b.

Namely, when a gray difference between display data of a previous horizontal period and display data of a current horizontal period is small, the output buffer 260 drives the source signals Sout with relatively low power in response to the driving control signal of the controller 270, and when a gray difference between display data of a previous horizontal period and display data of a current horizontal period is large, the output buffer 260 drives the source signals Sout with relatively high power in response to the driving control signal of the controller 270.

Therefore, according to the embodiment of the present disclosure, advantages are provided in that it is possible to control the power of an output buffer in consideration of a change in brightness between adjacent horizontal lines and as a result, it is possible to drive a driver with low power.

What is claimed is:

1. A timing controller of a display system, comprising:

a location weight provider configured to provide a location weight set according to the position of each horizontal line, each horizontal line displaying display data corresponding to a current horizontal period; and a data converter configured to output a transmission signal as a packet, the transmission signal having the display data and control data, wherein the control data includes a compensation weight generated using the location weight.

2. The timing controller according to claim 1, wherein the location weight provider stores a plurality of preset location weights corresponding to a plurality of display regions, respectively, into which a display panel is divided for each display region to include a plurality of horizontal lines, and provides the location weight of a display region in which the horizontal line is included.

3. The timing controller according to claim 2, wherein the location weight provider provides a location weight of a higher value as the display region is farther away from an input location of the display panel where a source signal corresponding to the display data is applied.

4. The timing controller according to claim 1, wherein the location weight provider comprises:

a location weight storage configured to store a plurality of preset location weights corresponding to a plurality of display regions, respectively, into which a display panel is divided, each display region includes a plurality of horizontal lines; and a location weight outputter configured to receive the display data to provide location information of the horizontal line corresponding to the current horizontal period on the display panel, to the location weight storage, and receive and output the location weight of the display region corresponding to the location information.

5. The timing controller according to claim 1, further comprising:

a gray weight provider configured to provide a gray weight corresponding to a gray difference between display data of a previous horizontal period and the display data of the current horizontal period; and a compensation weight provider configured to provide the compensation weight obtained by calculating the location weight and the gray weight, wherein the data converter configures the control data including the compensation weight, and outputs the transmission signal in which the display data and the control data are configured as a packet.

6. The timing controller according to claim 5, wherein the gray weight provider stores a plurality of preset gray weights corresponding to a plurality of gray difference ranges, respectively, into which a maximum range of the gray difference is divided, and provides the gray weight of a gray difference range in which the gray difference is included.

7. The timing controller according to claim 5, wherein the gray weight provider comprises:

a gray weight storage configured to store a plurality of preset gray weights corresponding to a plurality of gray difference ranges, respectively, into which a maximum range of the gray difference is divided; and a gray weight outputter configured to receive the display data to provide the gray difference between the display data of the previous horizontal period and the display data of the current horizontal period, to the gray weight storage, and receive and output the gray weight of a gray difference range in which the gray difference is included.

8. The timing controller according to claim 7, wherein the gray weight outputter provides a gray difference for each column between the display data of the previous horizontal period and the display data of the current horizontal period, to the gray weight storage, and receives and outputs a gray weight for each column.

9. A driver of a display system, comprising:

a recoverer configured to receive a transmission signal, and recover and output display data of a current horizontal period and control data included in the transmission signal;

a signal processing unit configured to generate an analog signal corresponding to the display data;

a controller configured to provide a driving control signal in response to a compensation weight included in the control data; and an output buffer configured to output a source signal corresponding to the analog signal, and be controlled by the driving control signal in power for outputting the source signal, wherein the compensation weight is generated using a location weight set according to the position of each horizontal line, each horizontal line displaying display data corresponding to a current horizontal period.

10. The driver according to claim 9, wherein the location weight corresponds to, among a plurality of preset location weights corresponding to a plurality of display regions, respectively, into which the display panel is divided for each display region to include a plurality of horizontal lines, a display region in which the horizontal line is included.

11. The driver according to claim 9, wherein the compensation weight is obtained by calculating the location weight and a gray weight, and the gray weight corresponds to, among a plurality of preset gray weights corresponding to a plurality of gray difference ranges, respectively, into which a maximum range of a gray difference is divided, a gray difference range in which the gray difference between display data of a previous horizontal period and the display data of the current horizontal period is included.

12. A display system comprising:

a timing controller configured to provide a transmission signal; and a driver configured to receive the transmission signal, recover display data of a current horizontal period and control data included in the transmission signal, and output a source signal corresponding to the display data and the control data, the timing controller comprising:

a location weight provider configured to provide a location weight set according to the position of each horizontal line, each horizontal line displaying display data corresponding to the current horizontal period;

a gray weight provider configured to provide a gray weight corresponding to a gray difference between display data of a previous horizontal period and the display data of the current horizontal period;

a compensation weight provider configured to provide a compensation weight obtained by calculating the location weight and the gray weight; and a data converter configured to output the transmission signal as a packet, the transmission signal having the display data and the control data, the control data including the compensation weight generated using the location weight, wherein the driver generates an analog signal corresponding to the display data and a driving control signal corresponding to the compensation weight, outputs a source signal corresponding to the analog signal through an output buffer, and controls power of the output buffer for outputting the source signal by the driving control signal.

13. The display system according to claim 12, wherein the location weight provider stores a plurality of preset location weights corresponding to a plurality of display regions, respectively, into which a display panel is divided for each display region to include a plurality of horizontal lines, and provides the location weight of a display region in which the horizontal line is included.

14. The display system according to claim 12, wherein the gray weight provider stores a plurality of preset gray weights corresponding to a plurality of gray difference ranges, respectively, into which a maximum range of the gray difference is divided, and provides the gray weight of a gray difference range in which the gray difference is included.

15. The display system according to claim 12, wherein the driver comprises:

a recoverer configured to receive the transmission signal, and recover and output the display data of the current horizontal period and the control data included in the transmission signal;

a signal processing unit configured to generate the analog signal corresponding to the display data;

a controller configured to provide the driving control signal in response to the compensation weight included in the control data; and the output buffer configured to output the source signal corresponding to the analog signal, and be controlled by the driving control signal in power for outputting the source signal.

* * * * *